No. 687,617. Patented Nov. 26, 1901.
E. EBI.
MOUTH ILLUMINATOR.
(Application filed Feb. 1, 1901. Renewed Sept. 13, 1901.)
(No Model.)
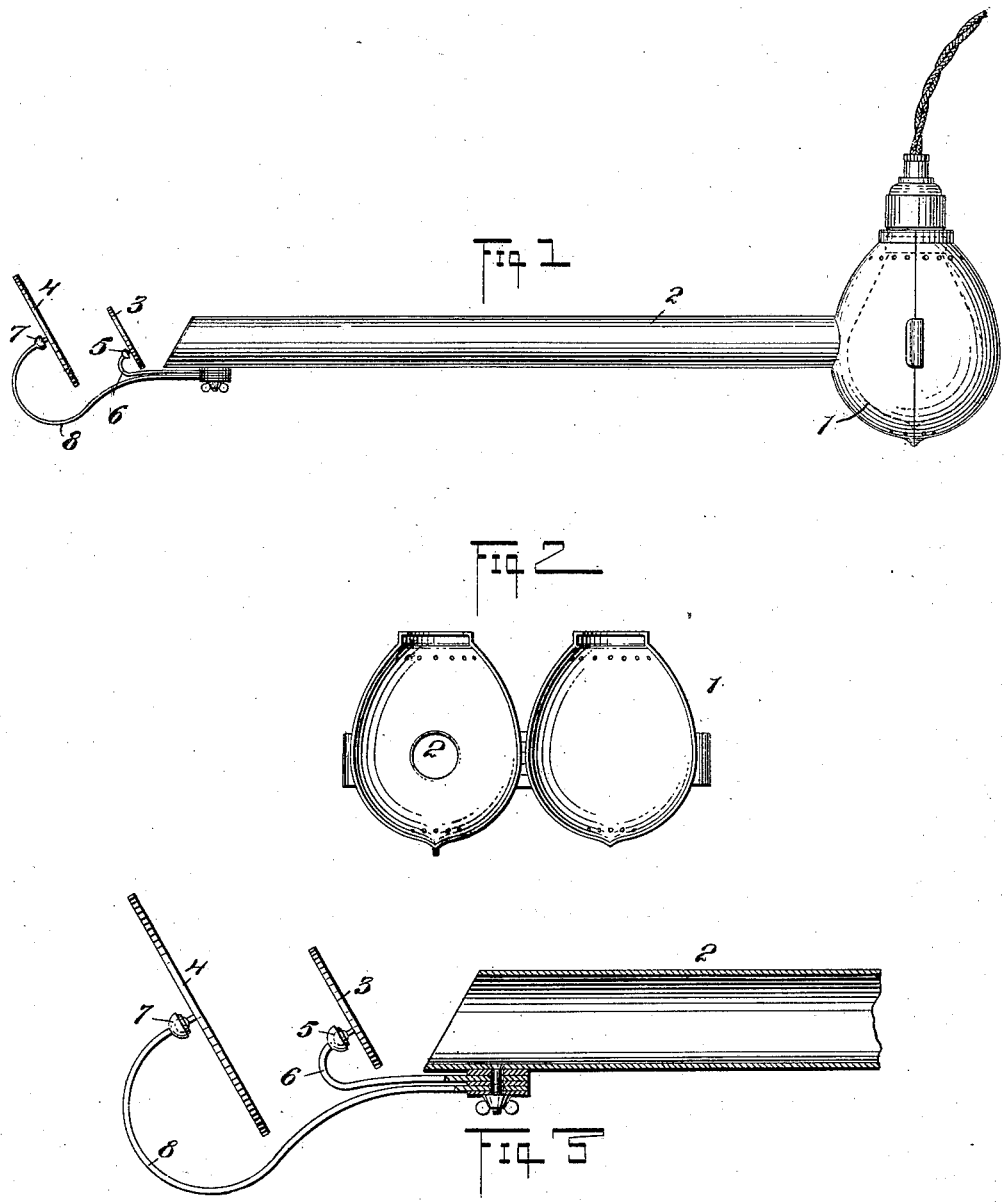
WITNESSES:
INVENTOR
Edward Ebi
BY
ATTORNEYS

UNITED STATES PATENT OFFICE.

EDWARD EBI, OF CEDAR RAPIDS, IOWA.

MOUTH-ILLUMINATOR.

SPECIFICATION forming part of Letters Patent No. 687,617, dated November 26, 1901.

Application filed February 1, 1901. Renewed September 13, 1901. Serial No. 75,323. (No model.)

*To all whom it may concern:*

Be it known that I, EDWARD EBI, a citizen of the United States, and a resident of Cedar Rapids, in the county of Linn and State of Iowa, have invented a new and Improved Mouth-Illuminator, of which the following is a full, clear, and exact description.

This invention relates to improvements in devices particularly adapted for the use of dentists and physicians in examining a person's teeth or mouth to locate and facilitate the operation upon any deranged part; and the object is to provide a device of this character that shall be simple in its construction and adapted to be connected to an incandescent electric lamp as an illuminating agent.

I will describe a mouth-illuminator embodying my invention and then point out the novel features in the appended claims.

Reference is to be had to the accompanying drawings, forming a part of this specification, in which similar characters of reference indicate corresponding parts in all the figures.

Figure 1 is a side view of a mouth-illuminator embodying my invention. Fig. 2 shows a lamp-casing employed, the same being illustrated as open; and Fig. 3 is a partial side view and partial section of the device.

Referring to the drawings, 1 designates a casing of suitable material—such, for instance, as metal—and made in two sections hinged together at one side and having a catch at the opposite side. This casing when closed is designed to inclose an incandescent lamp and is practically the shape of a lamp, although somewhat larger, so that there may be a free passage of air, which will circulate through openings in the upper and lower portions of the casing. This casing, on its inner side, will be polished, so as to serve as a reflector.

Extended from the casing is a tube 2, and supported at the end of this tube are mirrors 3 and 4. The mirror 3 is arranged between the end of the tube and the mirror 4 and is considerably smaller than said mirror 4. The mirror 3 is designed to reflect the light upon the parts to be examined, while the mirror 4 is designed to reflect the parts to be examined. The mirror 3 has a universal-joint connection 5 with an arm 6, extended from the tube 2, and the mirror 4 has a universal-joint connection 7 with an arm 8, extended from the tube. By these universal joints it is obvious that the mirrors may be turned at any desired angle relatively to each other to bring them in proper position for directing light upon and for observing the part to be examined in a person's mouth.

It is obvious that a device embodying my invention may be quickly applied to an incandescent lamp, and when said lamp is suspended by flexible connections the device may be readily moved from place to place or in any desired direction.

Having thus described my invention, I claim as new and desire to secure by Letters Patent—

1. A mouth-illuminator, comprising a casing adapted to inclose an illuminating-lamp, a tube extended from said casing, mirrors arranged forward of said tube, the mirror nearest the end of the tube being smaller than the other mirror, arms extended from the tube, and universal-joint connections between said arms and the mirrors, substantially as specified.

2. A mouth-illuminator, comprising a casing, consisting of two hinged sections adapted to engage around an incandescent lamp, a tube extended from the casing, arms extended from the end of said tube, and mirrors mounted to turn on said arms, the mirror nearest the end of the tube being smaller than the other mirror, substantially as specified.

3. A mouth-illuminator, comprising a tube adapted for connection with an illuminating device, a light-reflecting mirror arranged at the end of said tube, and an object-reflecting mirror larger than the first-named mirror, arranged at the end of said tube, the said two mirrors being adjustable relatively to each other, substantially as specified.

In testimony whereof I have signed my name to this specification in the presence of two subscribing witnesses.

EDWARD EBI.

Witnesses:
CHARLES J. HULL,
GEORGE M. SAFFORD.